April 29, 1969   A. L. FREEDLANDER ET AL   3,440,808

MOWER BLADE WITH MOUNTING PLATE

Filed March 13, 1968

*INVENTORS*
ABRAHAM L. FREEDLANDER
ROBERT E. MATTHEWS
WAYNE C. GARRETT

BY Reuben Wolf
*ATTORNEY*

United States Patent Office 3,440,808
Patented Apr. 29, 1969

3,440,808
MOWER BLADE WITH MOUNTING PLATE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Mar. 13, 1968, Ser. No. 712,633
Int. Cl. A01d 55/18
U.S. Cl. 56—295                                         4 Claims

ABSTRACT OF THE DISCLOSURE

A flexible mower blade having arms formed of an elastomeric material and a multi-section mounting plate embedded within the arms. The outer portions of the plate are semi-rigid and the central portion is rigid.

---

Figure 1:
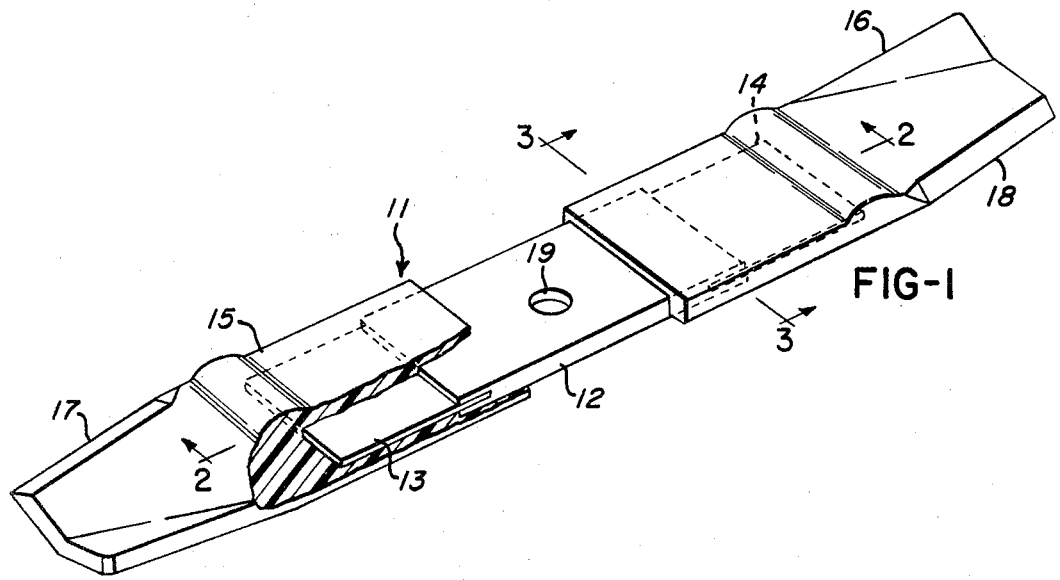

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc. the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get ofter during operation, but retains its initial properties that provide an excellent compromise between sufficient rigidity for cutting and sufficient flexibility for safety. The blade is also extremely simple to manufacture and very low in cost.

In our copending application Ser. No. 625,802 we have described a blade made primarily of an elastomer, but having a rigid central mounting plate embedded within the elastomer for mounting the blade upon the drive shaft. The present invention represents a blade having a different type of central mounting member in which only the center section of the member or plate is rigid, while the outer sections are semi-rigid. As indicated in the above-mentioned application, the embedded mounting member eliminates the need for separate mounting members, and at the same time tends to reduce the elongation of the elastomeric material, controls the twisting torque of the cutting area and affects the up and down deflection of the tips. By adding the outer semi-rigid sections to the plate, a little more deflection is permitted in the overall blade, without sacrificing the above advantages inherent in rigid materials.

The specific embodiments of the invention are described in the following specification and claims, and illustrated in the drawings, in which:

FIGURE 1 is a perspective view of a novel blade.

Figure 2:
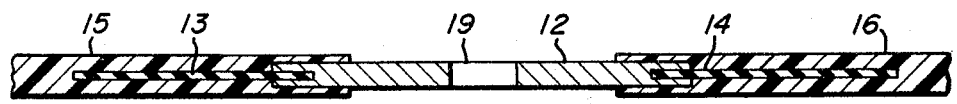
Figure 3:
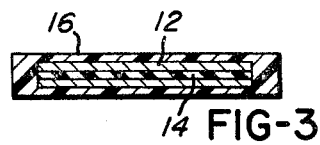

FIGURES 2 and 3 are cross-sectional views of the blade taken along lines 2—2 and 3—3 of FIGURE 1.

Figure 4:
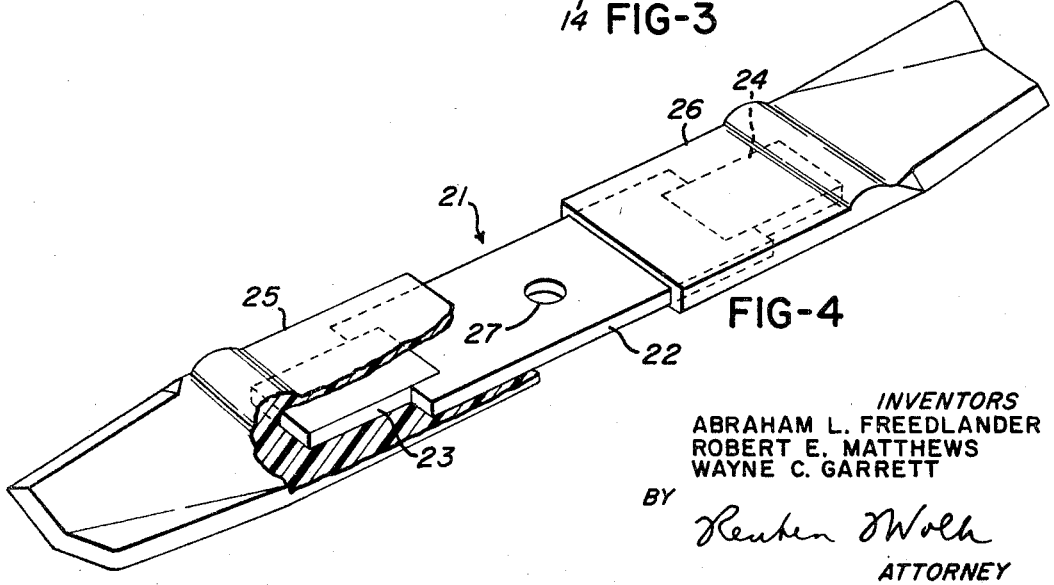

FIGURE 4 is a view similar to FIGURE 1 illustrating a modified form of the invention.

Referring to the drawings, FIGURE 1 illustrates a lawn mower blade 11 which is generally flat and rectangular and has outwardly extending arms 15 and 16 having cutting edges 17 and 18 at their extremities. These arms are made of an elastomer, and preferably of a urethane elastomer such as more fully described in our copending application referred to above, of the type which may be molded or cast and formulated from a polyester or polyether based isocyanate terminated prepolymer. Mounted within the central portion of the blade is a mounting member which is formed in three sections; the center section 12 is rigid and made of a metal or of a rigid plastic material such as nylon, polycarbonate, polystyrene, polyacetal, or the like; the outer sections 13 and 14 are made of a semi-rigid material such as hard rubber, polyvinyl chloride, or the like. The outer sections are shown as being inserted within the ends of the center section. The outer sections and a portion of the center section are embedded within the arms 15 and 16, a portion of section 14 being exposed so that aperture 19 in the center of the plate permits mounting on the shaft of a lawn mower and the use of the appropriate hardware for mounting. The aperture 19 may be made with a diameter which is required to fit the smallest of the lawn mowers on the market, so that it is only necessary for the user to drill this hole out to a larger diameter if required for his particular mower.

The lawn mower blade assembly made in accordance with the present invention has maximum degree of rigidity in the center where the blade is mounted on the drive shaft. The rigidity is created by the use of a central mounting member or plate, having a rigid center section and semi-rigid outer sections which permit a little more deflection than would be possible if the entire member were rigid, but less deflection than if there were no semi-rigid sections at all. These outer sections, therefore, serve as a compromise between the very rigid center section and the flexible arms which provide the cutting edges.

In the embodiments of the invention illustrated in FIGURES 1–3, the sections 13 and 14 are shown as being thinner than section 12 so that the assembly may occur by inserting sections 13 and 14 between the upper and lower surfaces of the ends of section 12.

FIGURE 4 illustrates a modified form of the invention in which the blade 21 has a mounting member formed in three sections, as above, but with a different relationship of the sections. The center section 22, in which is incorporated mounting hole 27 is made of the same rigid material as section 12, and the outer sections 23 and 24 are made of the same semi-rigid material as sections 13 and 14. In this modification, the sections 23 and 24 are the same thickness as the section 22, but are narrower so that the sections 23 and 24 may be inserted between the outer edges of section 22. All of sections 23 and 24, as well as the outer portion of section 22, are embedded within the arms 25 and 26 so that the plate assembly terminates inwardly of the cutting edges. The very center portion of section 22 is not embedded, for simplicity in mounting.

Other forms of the invention are contemplated wherein different assembly arrangements between the center and outer sections may be made, without departing from the scope of the invention.

We claim:

1. In a lawn mower having a rotatable shaft and a cutting blade mounted thereon, said blade including outwardly extending arms made of flexible elastomeric material and having cutting edges integral therewith, and a central mounting member extending outwardly into said arms and terminating inwardly of said cutting edges, said member comprising a center section made of a rigid material and outer sections made of material dissimilar from said center section and less rigid than said center section but more rigid than said arms.

2. The blade of claim 1 in which all of said outer sections and the outer portions of said center section are completely embedded in said arms.

3. The blade of claim 1 in which said center section is metal.

4. The blade of claim 1 in which said center section is a plastic selected from the group consisting of nylon, polycarbonate, polystyrene or polyacetal.

References Cited

UNITED STATES PATENTS

| | | | |
|---|---|---|---|
| 2,473,665 | 6/1949 | Van Nort | 170—159 |
| 3,320,732 | 6/1967 | Kirk | 56—295 |
| 3,340,682 | 9/1967 | Ely | 56—295 |

ABRAHAM G. STONE, *Primary Examiner.*

P. RAZZANO, *Assistant Examiner.*